United States Patent
Kirjavainen

(10) Patent No.: US 7,090,797 B2
(45) Date of Patent: Aug. 15, 2006

(54) EXTRUSION METHOD AND EXTRUSION DEVICE

(75) Inventor: Kari Kirjavainen, Tampere (FI)

(73) Assignee: Conenor Oy, Espoo (FI)

( * ) Notice: Subject to any disclaimer, the term of this patent is extended or adjusted under 35 U.S.C. 154(b) by 458 days.

(21) Appl. No.: 10/260,495

(22) Filed: Oct. 1, 2002

(65) Prior Publication Data

US 2003/0080461 A1 May 1, 2003

Related U.S. Application Data

(63) Continuation of application No. PCT/FI01/00510, filed on May 28, 2001.

(30) Foreign Application Priority Data

May 29, 2000 (FI) .................................. 20001278

(51) Int. Cl.
B29C 47/18 (2006.01)
B29C 47/06 (2006.01)

(52) U.S. Cl. ............ 264/167; 264/173.16; 264/211.21; 425/132

(58) Field of Classification Search ................ 264/167, 264/211.21, 177.16, 209.8; 425/132, 133.1, 425/147, 166, 382 R
See application file for complete search history.

(56) References Cited

U.S. PATENT DOCUMENTS

| | | | |
|---|---|---|---|
| 4,149,839 A | | 4/1979 | Iwawaki et al. |
| 4,469,475 A | * | 9/1984 | Krysiak ....................... 425/132 |
| 4,659,580 A | * | 4/1987 | Svengren ..................... 426/516 |
| 4,876,052 A | * | 10/1989 | Yamada et al. ............. 264/148 |
| 5,062,782 A | * | 11/1991 | Tompkins et al. .......... 425/113 |
| 5,128,084 A | * | 7/1992 | Tomphins et al. .......... 264/167 |
| 5,556,653 A | * | 9/1996 | Binley ........................ 426/101 |
| 5,785,920 A | * | 7/1998 | Ogawa et al. .............. 264/515 |
| 6,309,574 B1 | * | 10/2001 | Jarvenkyla et al. ......... 264/126 |

FOREIGN PATENT DOCUMENTS

| | | |
|---|---|---|
| EP | 0 468 261 A3 | 1/1992 |
| EP | 0 891 769 A1 | 1/1999 |
| WO | 91/10425 | 7/1991 |
| WO | 97/01428 | 1/1997 |
| WO | 97/15293 | 5/1997 |

* cited by examiner

*Primary Examiner*—Mark Eashoo
(74) *Attorney, Agent, or Firm*—Young & Thompson

(57) ABSTRACT

An extrusion method and an extrusion device, whereby at least two different flows of material are supplied from the extrusion device to a nozzle. The nozzle comprises at least two nozzle chambers such that the material flowing through the first nozzle chamber forms an outer part of a product, and the material flowing through the second nozzle part forms an inner part of the product. The capacity of the nozzle chambers is changed, whereby the relative proportion of the different parts of the product can be varied. When the capacity of the nozzle chamber is decreased, the amount of material flowing therethrough increases at the outlet of the nozzle, and when the capacity of the nozzle chamber is increased, the amount of material flowing out there-through decreases at the outlet of the nozzle.

9 Claims, 3 Drawing Sheets

EXTRUSION METHOD AND EXTRUSION DEVICE

BACKGROUND OF THE INVENTION

The invention relates to an extrusion method which uses an extrusion device comprising a nozzle such that the extrusion device comprises means for supplying at least two different materials through the nozzle, and a product is produced by the nozzle, the product comprising at least two different materials whose relative proportion varies in an end product, the nozzle comprising at least two nozzle chambers such that the material flowing through a first nozzle chamber forms an outer part of the product and the material flowing through a second nozzle chamber forms an inner part of the product.

The invention further relates to an extrusion device comprising a nozzle and means for extruding at least two different materials through the nozzle, the nozzle comprising at least two nozzle chambers such that the material flowing through the first nozzle chamber forms an outer part of a product to be produced and the material flowing through the second nozzle chamber forms an inner part of the product.

EP 0 891 769 discloses a solution wherein two different extruders are used for supplying material to a two-layer nozzle. In the two-layer nozzle, the material flow in the inner layer is disrupted by a valve mechanism. So-called encapsulated extrusion products are thus produced wherein the inner material is arranged discontinuously inside the outer material. Disrupting the material flow by the valve mechanism, however, disturbs the operation of the extruder because the extruder is subjected to pressure pulsation. The operation of the extruder is thus disturbed, which means that the product will not be equal in quality.

SUMMARY OF THE INVENTION

An object of the invention is to provide an improved extrusion method and extrusion device.

The extrusion method of the invention is characterized in that the capacities of the nozzle chambers are adjusted such that when the nozzle chamber decreases, the amount of material flowing therethrough increases at the outlet of the nozzle, and when the capacity of the nozzle chamber is increased, the amount of material flowing therethrough decreases at the outlet of the nozzle.

The extrusion device of the invention is characterized in that it comprises means for changing the capacities of the nozzle chambers such that when the capacity of the nozzle chamber is decreased, the amount of material flowing therethrough increases at the outlet of the nozzle, and when the capacity of the nozzle chamber is increased, the amount of material flowing therethrough decreases at the outlet of the nozzle.

The idea underlying the invention is that at least two different flows of material are supplied from the extrusion device to the nozzle. The nozzle comprises at least two nozzle chambers and at least one movable nozzle part such that the nozzle part can be used for changing the capacity of the nozzle chambers. The material supplied from a first nozzle chamber forms the outer part of the product and the material supplied from a second nozzle chamber forms the inner part of the product. By changing the capacity of the nozzle chambers, the relative proportion of different parts of the product can be varied in the end product. When the capacity of the first nozzle chamber is increased, the material flow discharged therefrom decreases, and if the capacity of the second nozzle chamber is simultaneously decreased, a larger amount of the inner material is then supplied, i.e. there is a larger amount of the inner material at that point in the end product than at some other point of the product. Correspondingly, when the capacities of the nozzle chambers are adjusted such that the capacity of the first nozzle chamber is decreased while the capacity of the second nozzle chamber is increased, the nozzle supplies a larger amount of the material from the first nozzle chamber and a smaller amount of the material from the second nozzle chamber. The underlying idea of a preferred embodiment is that the nozzle chambers are conical. The underlying idea of a second preferred embodiment is that the extruder which supplies the material to the nozzle chambers is conical such that it comprises at least two convergent, conical supplying slots within each other. The underlying idea of a third preferred embodiment is that the capacities of the nozzle chambers are controlled such that the inner part of the product is discontinuous, i.e. at some stage, the capacity of the second nozzle is increased so much that no material at all flows out therefrom. The underlying idea of a fourth preferred embodiment is that a part which forms the part between the nozzle chambers is integrated in the rotor of the extruder.

An advantage of the invention is that the proportions of the parts of the product to be produced can be adjusted in a versatile manner without causing pressure pulsation in the extruder which supplies the material to the nozzle. The total flow of the material to be extruded can be stabilized, i.e. if desired, the product can be arranged even throughout. When necessary, the thickness and shape of the product can be adjusted as desired.

BRIEF DESCRIPTION OF THE DRAWINGS

The invention will be described in closer detail in connection with the accompanying drawings, in which.

DESCRIPTION OF THE PREFERRED EMBODIMENTS

Figure 1:
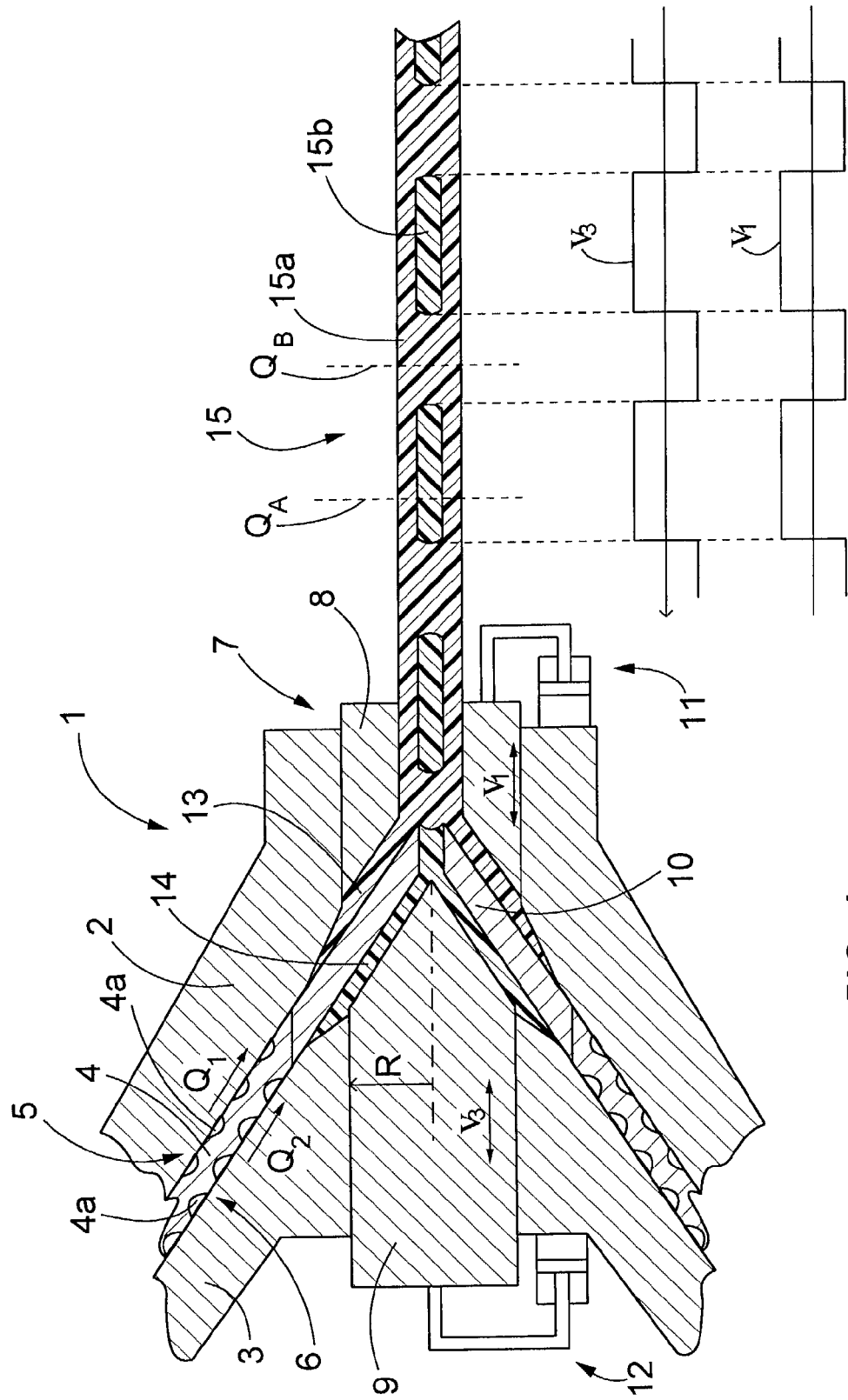
FIG. 1 is a schematic, cross-sectional side view of an extrusion device.

FIG. 1 shows an extrusion device 1. The extrusion device 1 comprises an outer stator 2 and an inner stator 3. A conical rotor 4 is arranged between the stators 2 and 3 such that an outer conical and circular supplying slot 5 is provided between the outer stator 2 and the rotor 4, and an inner conical and circular supplying slot 6 is provided between the inner stator 3 and the rotor 4. The rotor 4 comprises grooves 4a such that when the rotor 4 rotates, a material flows along the supplying slots 5 and 6 towards the outlet of the extrusion device 1. In addition to or in place of the rotor 4, grooves can also be arranged in the stators 2 and/or 3. For the sake of clarity, FIG. 1 lacks supplying devices to supply the material to the supplying slots 5 and 6. Further, for the sake of clarity, FIG. 1 lacks rotating devices of the rotor 4. The aforementioned devices are obvious to one skilled in the art; therefore, they will not be discussed in closer detail in this connection.

The extrusion device 1 further comprises a nozzle 7. The nozzle 7 comprises an outer nozzle part 8, an inner nozzle part 9 and a middle nozzle part 10, i.e. an intermediate part. The middle nozzle part 10 is arranged to be integrated in the rotor 4, in which case the middle nozzle part 10 rotates with the rotor 4. The outer nozzle part 8 and the inner nozzle part 9 are nonrotating. Instead, the outer nozzle part 8 is moved in the axial direction by an operating device 11, and the inner nozzle part 9 is similarly moved in the axial direction by an operating device 12. The operating devices 11 and 12 may be, for example, hydraulic or electromechanical ones. An outer circular and conical nozzle chamber 13 is provided between the outer nozzle part 8 and the middle nozzle part 10. An inner circular and conical nozzle chamber 14 is provided between the inner nozzle part 9 and the middle nozzle part 10.

The to-and-from motion of the outer nozzle part 8 is illustrated by designation $v_1$, which variable $v_1$ also describes the movement rate of the outer nozzle part 8. Similarly, the to-and-from motion of the inner nozzle part 9 in the axial direction is illustrated by designation $v_3$, which similarly describes the movement rate of the inner nozzle part 9. The rightward direction as seen in FIG. 1 is determined to be the positive direction of rates $v_1$ and $v_3$.

When the outer nozzle part 8 is moved rightwards as seen in FIG. 1 at a rate $v_1$, the capacity of the outer nozzle chamber 13 increases. Hence, the material flow supplied along the outer supplying slot 5 out of the nozzle 7 decreases. If the inner nozzle part 9 is simultaneously also moved rightwards as seen in FIG. 1 at a rate $v_3$, the inner nozzle chamber 14 decreases, and a larger amount of the material supplied along the inner supplying slot 6 flows out of the nozzle 7. If, on the other hand, the outer nozzle part 8 is moved leftwards as seen in FIG. 1, the outer nozzle chamber 13 decreases, and a larger amount of the material supplied along the outer supplying slot 5 flows from the nozzle 7. If, again, the inner nozzle part is simultaneously moved leftwards as seen in FIG. 1, the capacity of the inner nozzle chamber 14 increases, and a smaller amount of the material supplied along the inner supplying slot 6 flows from the nozzle 7. In the case shown by FIG. 1, the inner nozzle part 9 is moved leftwards at such a high rate that, at intervals, no material supplied along the inner supplying slot 6 flows from the nozzle 7 at all. A product 15 is thus achieved comprising an outer part 15a and, as discontinuous parts inside the outer part 15a, an inner part 15b. The product 15 may be, for example, a plastic product wherein the outer part 15a and the inner part 15b are made of different plastic materials. The product 15 may also be, for example, a product of food industry wherein the outer part 15a and the inner part 15b are made of different food materials. The product 15 can also be used as a blow moulding blank such that the softer part 15b is arranged inside the outer part 15a, and, when blow moulding, air is blown inside the inner part 15b, which results in the outer part 15a becoming a plastic bottle, for example.

The material flow flowing along the outer supplying slot 5 is indicated by designation $Q_1$. Correspondingly, the material flow flowing along the inner supplying slot 6 is indicated by designation $Q_2$. A material flow Q discharged from the nozzle 7, i.e. the output of the extrusion device, is obtained from the formula $$Q=Q_2+\pi R^2 v_3+Q_1-\pi R^2 v_1,$$

where R is the radius of the nozzle chambers 13 and 14. The radius of the nozzle chambers 13 and 14 may also differ in size, the radius of the outer nozzle chamber 13 being used in connection with rate $v_1$ in the aforementioned formula, and the radius of the inner nozzle chamber 14 being used in connection with rate $v_3$. In the case of FIG. 1, the output Q is always constant, i.e. $Q_A$ equals $Q_B$. $Q_A$ describes the material flow at a point where the product 15 is provided with the inner part 15b and the outer part 15a, and, correspondingly, $Q_B$ describes the material flow at a point where the product 15 is only provided with the material which forms the outer part 15a. The material flow $Q_A$ is thus formed according to the following formula:

$$Q_A=Q_2+\pi R^2 v_3+Q_1-\pi R^2 v_1.$$

If the outer nozzle part 8 and the inner nozzle part 9 are immovable in the axial direction, i.e. $v_1$ and $v_3$ equalled 0, then $Q_A=Q_2+Q_1$. At point $Q_B$ is $$Q_2+\pi R^2 v_3=0.$$

The rate of the inner nozzle part 9 has thus been negative and so high that the increase of capacity of the inner nozzle chamber 14 has compensated for the material flow $Q_2$ supplied along the inner supplying slot. Hence, $$Q_B=Q_1-\pi R^2 v_1$$

FIG. 1 also illustrates the changes of rates $v_1$ and $v_3$ when the product is being produced.

Rates $v_1$ and $v_3$ are synchronized according to the output of the extrusion device 1 by using the operating devices 11 and 12. The operating devices 11 and 12 can be controlled by microprocessors, for example, in which case rates can be adjusted quickly and accurately, and complex functions can also be utilized in the adjustment.

Figure 2:
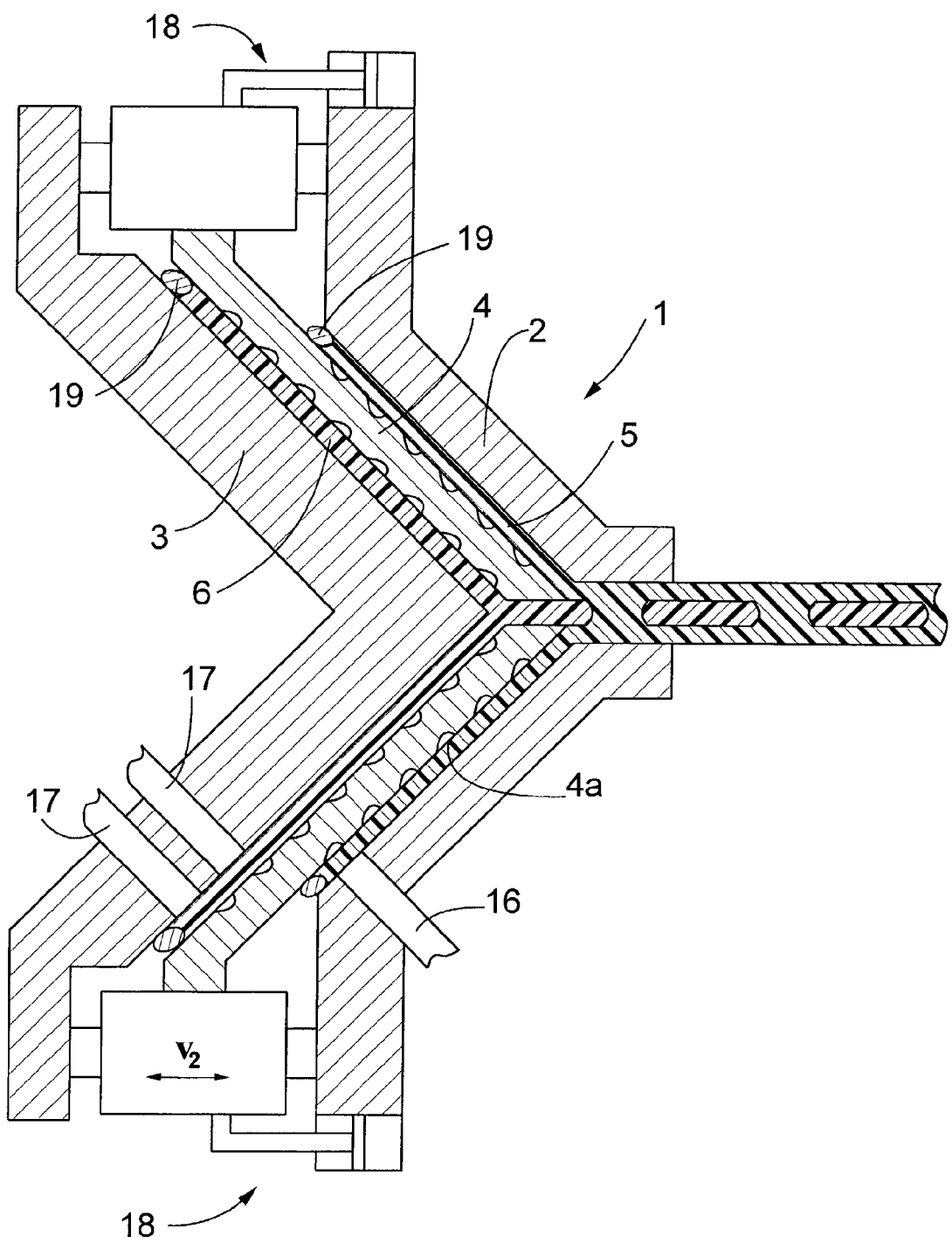
FIG. 2 is a schematic, cross-sectional side view of another extrusion device, FIGS. 3a and 3b schematically show an embodiment of a solution according to the invention, and FIG. 4 schematically shows a detail of a nozzle of a third extrusion device.

FIG. 2 shows an extrusion device 1 comprising no separate nozzle 7, but stators 2 and 3 and a rotor 4 form the nozzle, and the outer supplying slot 5 corresponds to the outer nozzle chamber 13 and the inner supplying slot corresponds to the inner nozzle chamber 14. FIG. 2 also shows an outer supplying device 16 to supply the material into the outer supplying slot 5, and inner supplying devices 17 to supply the material into the inner supplying slot 6 in a manner known per se.

The rotor 4 comprises grooves 4a such that when the rotor 4 rotates, the material flows out of the extrusion device along the supplying slots 5 and 6. In addition to or in place of the rotor 4, grooves may also be arranged in the stators 2 and/or 3. The rotor 4 is arranged to be movable by operating devices 18 corresponding to the operating devices 11 and 12. Arrow $v_2$ illustrates the to-and-from motion in the axial direction and the rate of movement of the rotor 4. Compared with the case of FIG. 1, only one part movable in the axial direction is thus needed. In the case of FIG. 2, however, the capacity of the outer supplying slot 5 and the inner supplying slot 6 proportionally varies in a substantially similar manner. Consequently, in the embodiment of FIG. 1, it is possible to adjust the characteristics of the end product in a more versatile and variable manner. In the embodiment of FIG. 2, the rotor 4 is equipped with circular gear system which can be moved backwards and forwards in the axial direction. Said structure is known to one skilled in the art; therefore, it will not be disclosed in closer detail in this connection. The circle of the extruder 1 can be provided with several operating devices 18 at three different points, for example, such that by adjusting the operating devices in a different manner, the rotor 4 can be inclined. Then, by inclining the rotor 4, the product can be centralized or the material flow can be directed eccentrically, if desired. By changing the inclination, for example, a product is achieved which varies spirally in its thickness at different points. In the supplying slots 5 and 6 located inside and outside the rotor 4, seals 19 are arranged capable of varying their thickness so as to prevent the material from flowing out from the wider end of the rotor 4.

Figure 3A:
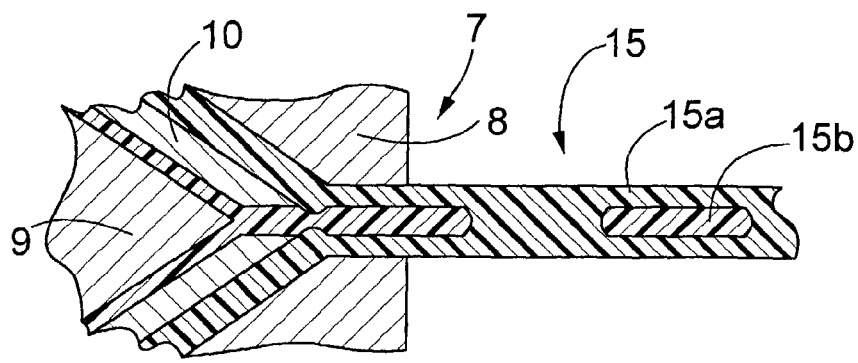
Figure 3B:
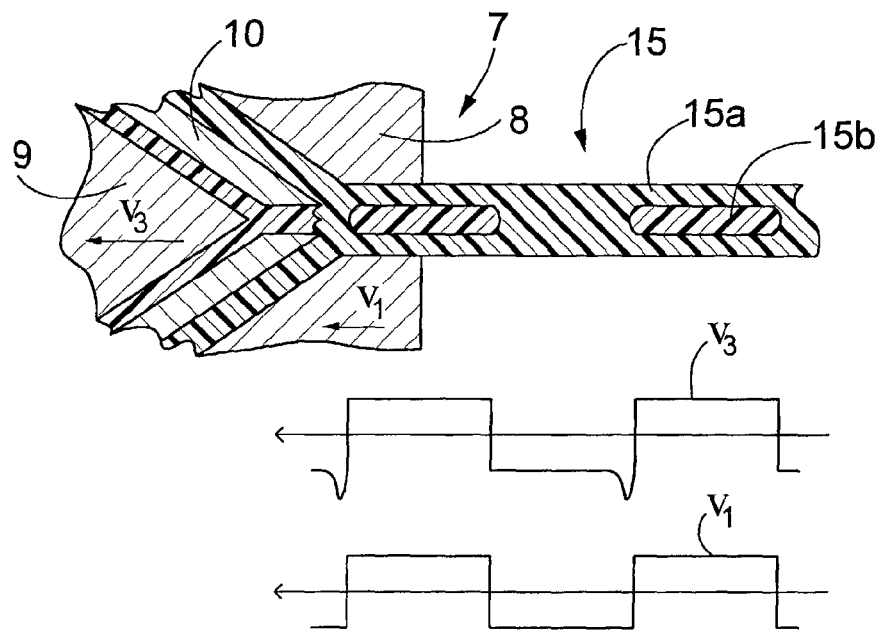

FIGS. 3a and 3b show a situation wherein a point of discontinuity is formed in the inner part 15b of the product 15. In order to ensure that the material flow forming the inner part 15b is disrupted, the inner nozzle part 9 is overcontrolled, i.e. rate $v_3$ is temporarily arranged higher than rate $v_1$. The change in rate $v_3$ is illustrated by a curve in FIG. 3b. A suction effect towards the left as seen in FIGS. 3a and 3b is then formed in the inner material flow at the end part of the middle nozzle part, which interrupts the inner material flow.

Figure 4:
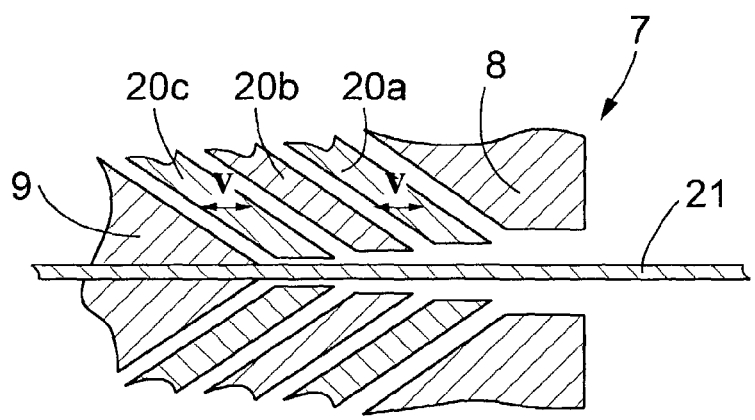

FIG. 4 shows a solution wherein the nozzle 7 comprises three intermediate parts 20a, 20b and 20c between the outer nozzle part 8 and the inner nozzle part 9. Every other intermediate part, i.e. the intermediate part 20a and the intermediate part 20c, is arranged to be moved backwards and forwards, which is illustrated by arrows v in the figure. A product can thus be achieved which comprises several layers whose relative proportions can be varied. FIG. 4 further shows a solution wherein a continuous material or a material flow 21, which can, for example, be a cable, particularly an optical cable, or another coating product, is supplied from the middle of the nozzle 7.

The drawings and the related description are only intended to illustrate the idea of the invention. The extent of the invention may vary within the scope of the claims. Hence, the inner part 15b in the product 15 may be continuous and the outer part 15a discontinuous. Furthermore, if desired, the product 15 may have varying external dimensions, i.e. total thickness. The nozzle chambers of the nozzle may also have another shape than that of a cone. They can, for example, be sheet-like. The most preferably, however, the nozzle chambers are conical, thus enabling the easiest way to adjust the extrusion device; thus, an even discharge flow can also be more easily achieved. The rotor and the stator may also have another shape than that of a cone, but a conical rotor, stator and nozzle part provide the simplest and easiest solution to adjust. Furthermore, the extrusion device 1 can also be implemented such that a stator is provided between the outer supplying slot 5 and the inner supplying slot 6, and a rotor outside the outer supplying slot 5 and another rotor inside the inner supplying slot 6. Naturally, there can be several rotors and stators, in which case a nozzle according to FIG. 4 is used. The shape of the outlet opening of the nozzle 7 may also vary. The outlet opening can thus be, for example, circular or angular, a profile shape or having a shape to produce a sheet-like product.

The invention claimed is:

1. A method of extruding a product having two different materials, the method comprising the steps of:
    providing an extrusion device that has a nozzle outlet and two nozzle chambers supplying respective different materials to the nozzle outlet, a first of the two nozzle chambers supplying material for an outer part of the product and a second of the two nozzle chambers supplying material for an inner part of the product;
    supplying the respective different materials to the two nozzle chambers;
    increasing a size of the first of the two nozzle chambers at a rate that causes a decrease in an amount of the material from the first of the two nozzle chambers proceeding to the nozzle outlet; and
    decreasing a size of the second of the two nozzle chambers at a rate that causes an increase in an amount of the material from the second of the two nozzle chambers proceeding to the nozzle outlet.

2. The method of claim 1, further comprising the steps of increasing a size of the second of the two nozzle chambers at a rate that causes a decrease in an amount of the material from the second of the two nozzle chambers proceeding to the nozzle outlet, and decreasing a size of the first of the two nozzle chambers at a rate that causes an increase in an amount of the material from the first of the two nozzle chambers proceeding to the nozzle outlet.

3. A method as claimed in claim 1, wherein the capacities of the nozzle chambers are adjusted such that at least one of the parts of the product is arranged discontinuous.

4. A method as claimed in claim 3, wherein the capacities of the nozzle chambers are adjusted such that the inner part of the product is arranged discontinuous.

5. A method as claimed in claim 1, wherein the step of providing the extrusion device comprises the step of making the nozzle chambers conical.

6. A method as claimed in claim 1, wherein the step of providing the extrusion device comprises the step of making the extrusion device conical.

7. A method as claimed in claim 1, wherein the capacities of the nozzle chambers are adjusted independently of each other.

8. An extrusion method for producing a product comprising at least two different materials whose relative proportion varies in the product, the method comprising:
    providing an extrusion device comprising a nozzle and supplying means for supplying material through the nozzle, the nozzle comprising at least a first nozzle chamber and a second nozzle chamber such that the material flowing through the first nozzle chamber forms an outer part of the product and the material flowing through the second nozzle chamber forms an inner part of the product;
    supplying at least two different materials through the nozzle; and
    adjusting the capacities of the nozzle chambers such that when the capacity of a respective one of the nozzle chambers decreases, the amount of material from the respective nozzle chamber increases at the outlet of the nozzle, or when the capacity of the respective nozzle chamber increases, the amount of material from the respective nozzle chamber decreases at the outlet of the nozzle,
    wherein the step of providing the extrusion device comprises the step of making the nozzle with a part between the nozzle chambers which is integrated into a rotor in the extrusion device.

9. An extrusion method for producing a product comprising at least two different materials whose relative proportion varies in the product, the method comprising:
    providing an extrusion device comprising a nozzle and supplying means for supplying material through the nozzle, the nozzle comprising at least a first nozzle chamber and a second nozzle chamber such that the material flowing through the first nozzle chamber forms an outer part of the product and the material flowing through the second nozzle chamber forms an inner part of the product;
    supplying at least two different materials through the nozzle; and adjusting the capacities of the nozzle chambers such that when the capacity of a respective one of the nozzle chambers decreases, the amount of material from the respective nozzle chamber increases at the outlet of the nozzle, or when the capacity of the respective nozzle chamber increases, the amount of material from the respective nozzle chamber decreases at the outlet of the nozzle, wherein between the nozzle chambers is arranged a part, which is moved to simultaneously adjust the capacities of the nozzle chambers such that when the capacity of the first nozzle chamber decreases, the capacity of the second nozzle chamber increases, and vice versa.

* * * * *